United States Patent
Wu et al.

(10) Patent No.: US 8,225,608 B2
(45) Date of Patent: Jul. 24, 2012

(54) HYBRID POWERTRAIN AND METHOD FOR CONTROLLING A HYBRID POWERTRAIN

(75) Inventors: Ko-Jen Wu, Troy, MI (US); Jian Jun Zhang, Rochester, MI (US); James C. Elmslie, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 837 days.

(21) Appl. No.: 12/264,290

(22) Filed: Nov. 4, 2008

(65) Prior Publication Data

US 2010/0107632 A1    May 6, 2010

(51) Int. Cl.
F02B 33/44    (2006.01)
(52) U.S. Cl. ............................................. 60/608; 60/607
(58) Field of Classification Search ................. 180/65.1, 180/65.21, 65.26; 60/607, 608
See application file for complete search history.

(56) References Cited

U.S. PATENT DOCUMENTS

| | | | | |
|---|---|---|---|---|
| 5,038,566 A * | 8/1991 | Hara | | 60/608 |
| 5,076,059 A * | 12/1991 | Okada | | 60/608 |
| 5,088,286 A * | 2/1992 | Muraji | | 60/608 |
| 5,678,407 A * | 10/1997 | Hara | | 60/608 |
| 5,881,559 A * | 3/1999 | Kawamura | | 60/597 |
| 5,906,098 A * | 5/1999 | Woollenweber et al. | | 60/608 |
| 6,604,360 B1 * | 8/2003 | Vuk | | 60/597 |
| 6,809,429 B1 * | 10/2004 | Frank | | 290/40 C |
| 6,922,996 B2 * | 8/2005 | Ellmer et al. | | 60/608 |
| 6,931,850 B2 * | 8/2005 | Frank et al. | | 60/608 |
| 7,703,283 B2 * | 4/2010 | Barker | | 60/608 |
| 2003/0160455 A1 * | 8/2003 | Hu et al. | | 290/40 C |
| 2003/0188533 A1 * | 10/2003 | Jaster | | 60/608 |
| 2005/0061561 A1 * | 3/2005 | Leonardi et al. | | 180/65.1 |
| 2006/0030450 A1 * | 2/2006 | Kyle | | 477/3 |
| 2006/0123784 A1 * | 6/2006 | Algrain | | 60/608 |
| 2006/0174624 A1 * | 8/2006 | Grabowski et al. | | 60/709 |
| 2007/0062191 A1 * | 3/2007 | Furman et al. | | 60/607 |
| 2007/0151241 A1 * | 7/2007 | Arnold | | 60/605.1 |
| 2007/0213174 A1 * | 9/2007 | Tamai et al. | | 477/52 |
| 2009/0048745 A1 * | 2/2009 | Wu et al. | | 701/51 |

OTHER PUBLICATIONS

Craig Balis, Chris Middlemass, S. M. Shahed, "Design & Development of E-Turbo for SUV and Light Truck Applications", Diesel Engine Emissions Reduction Conference, 2003.
Steve Arnold, Craig Balis, Denis Jeckel, Sylvie Larcher, Philippe Uhl, S. M. Shahed, "Advances in Turbocharging Technology and its Impact on Meeting Proposed California GHG Emission Regulations", SAE Paper 2005-01-1852.
S. M. Shahed, "An Analysis of Assisted Turbocharging with Light Hybrid Powertrain", SAE Paper 2006-01-0019.

* cited by examiner

*Primary Examiner* — Thomas Denion
*Assistant Examiner* — Cameron Setayesh
(74) *Attorney, Agent, or Firm* — Quinn Law Group, PLLC

(57) ABSTRACT

A hybrid powertrain for a vehicle is provided. The powertrain includes an engine boosted by a turbocharger. The turbocharger includes a first motor-generator mounted with respect to the turbocharger, and arranged to selectively assist acceleration of the vehicle by driving the turbocharger, to provide regenerative charging of an energy storage device and to be idle, as its modes of operation. The powertrain additionally includes a second motor-generator mounted with respect to the powertrain, and arranged to selectively assist acceleration of the vehicle, to provide regenerative charging of the energy storage device and to be idle, as its modes of operation. A controller responsive to sensed vehicle operating parameters is arranged on the vehicle for controlling and coordinating the modes of operation of the first motor-generator and of the second motor-generator.

17 Claims, 3 Drawing Sheets

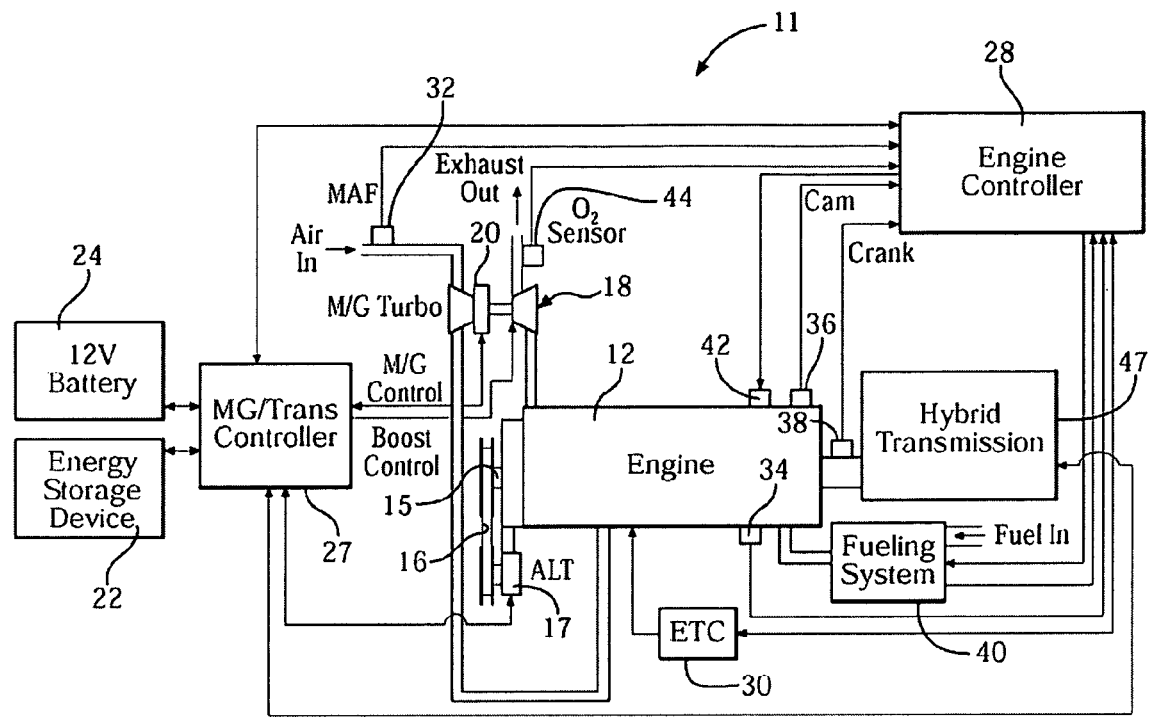

FIG. 2

| MGT | MGU | Option Group | MGT | MGU | Option Group | MGT | MGU | Option Group |
|---|---|---|---|---|---|---|---|---|
| Turbo Acc. Assist | Torque Assist | ① | Exh. Regen. Charging | Torque Assist | ② | Idle | Torque Assist | ① |
| Turbo Acc. Assist | Decel. Regen. Charging | ① | Exh. Regen. Charging | Decel. Regen. Charging | ② | Idle | Decel. Regen. Charging | |
| Turbo Acc. Assist | Charging | ① | Exh. Regen. Charging | Charging | ② | Idle | Charging | |
| Turbo Acc. Assist | Idle | ① | Exh. Regen. Charging | Idle | ② | Idle | Idle | |

FIG. 3

HYBRID POWERTRAIN AND METHOD FOR CONTROLLING A HYBRID POWERTRAIN

TECHNICAL FIELD

The invention relates to a hybrid vehicle powertrain employing an internal combustion engine assisted by a turbocharger with a motor-generator.

BACKGROUND OF THE INVENTION

In contemporary vehicles, forced induction, such as via an exhaust driven turbocharger, is typically utilized to improve internal combustion (IC) engine efficiency. A turbocharger may permit an internal combustion engine to generate more power from a given engine displacement by generating boost, i.e. increasing mass of air entering the engine's combustion chamber.

Efficiency of a turbocharged engine typically depends on the capability of the turbocharger to generate boost in response to a vehicle operator's demand for acceleration. Generating boost commensurate with operator demand, however, can be a challenge due to the turbocharger's rotating inertia, particularly at lower engine speeds when engine exhaust pressure is low. One approach to obtaining improved turbocharger response is to assist engine exhaust pressure in spooling up the turbocharger via an electric motor. In such a case, the electric motor assist is typically integrated into the turbocharger assembly.

SUMMARY OF THE INVENTION

A hybrid powertrain for a vehicle is provided. Specifically, the powertrain has an engine arranged to propel the vehicle. A turbocharger is arranged relative to the engine for boosting torque of the engine and assisting acceleration of the vehicle. An energy storage device is arranged on the vehicle for storing electrical energy. A first motor-generator is mounted with respect to the turbocharger and arranged to selectively assist acceleration of the vehicle by driving the turbocharger, to provide regenerative charging of the energy storage device and to be idle, as modes of operation. A second motor-generator is mounted with respect to the powertrain and arranged to selectively assist acceleration of the vehicle, to provide regenerative charging of the energy storage device and to be idle, as modes of operation. A sensor is arranged on the vehicle for sensing vehicle operating parameters. A controller responsive to the sensed vehicle operating parameters is arranged on the vehicle for controlling and coordinating the modes of operation of the first motor-generator and of the second motor-generator.

The controller may have a stored algorithm in which the modes of operation of the first motor-generator and of the second motor-generator, which can assist vehicle acceleration, are arranged as mode combinations into a first group, and the modes of operation when the first motor-generator is in the regenerative charging mode are arranged as mode combinations into a second group. The controller may be arranged to select a combination from the first group to assist vehicle acceleration and from the second group to provide regenerative charging.

The first motor-generator may be integrated with the turbocharger. The hybrid powertrain may additionally comprise a transmission arranged on the vehicle for transmitting torque from the engine, and the vehicle operating parameters may include engine data, transmission data and vehicle speed.

The second motor-generator may also be integrated with the transmission, and the controller may additionally control function of the transmission.

In accordance with another aspect of the present invention a method of controlling a hybrid vehicle powertrain which includes an engine with a turbocharger is also provided. The method includes monitoring a vehicle operator selected vehicle acceleration and vehicle deceleration and monitoring vehicle operating parameters. Likewise, the method includes monitoring operating conditions of a first motor-generator for the turbocharger, and of a second motor-generator for the vehicle. The method additionally includes combining modes of operation of the first motor-generator and modes of operation of the second motor-generator where vehicle acceleration is assisted, and combining modes of operation of the first motor-generator and modes of operation of the second motor-generator where regenerative charging is provided. The modes of operation of the first motor-generator include conditions in which vehicle acceleration is assisted; regenerative charging of an energy storage device arranged on the vehicle is provided; and the first motor-generator is idle. Likewise, the modes of operation of the second motor-generator include conditions in which vehicle acceleration is assisted; regenerative charging of the energy storage device is provided; and the second motor-generator is idle.

The method also includes grouping into a first option combinations of the modes of operation of the first motor-generator and the modes of operation of the second motor-generator where vehicle acceleration is assisted, and grouping into a second option combinations of the modes of operation of the first motor-generator and the modes of operation of the second motor-generator where regenerative charging is provided. Additionally, the method includes controlling and coordinating operation of first motor-generator and of the second motor-generator by selecting from the combinations in the first option for acceleration assist, and from combinations in the second option for deceleration.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic illustration of the MGT integrated in a strong hybrid powertrain;

FIG. 3 is a table illustrating combinations of possible operating modes of the MGT and of a motor-generator unit (MGU) in the hybrid powertrain of FIG. 1;

DESCRIPTION OF THE PREFERRED EMBODIMENTS

In hybrid vehicles, an electric motor-generator is typically combined with an internal combustion (IC) engine to assist with vehicle propulsion for improved powertrain efficiency. Such a vehicle may also utilize a turbocharged version of the IC engine. In such an application, a turbocharger may employ an electric motor assist able to function as an electric generator to complement operation of the hybrid's existing motor-generator. In such a hybrid, electric energy may be regenerated by operating the turbocharger's electric motor via the turbocharger, as the turbocharger is spinning down from high boost speeds. Thus configured, such so-called turbocharger motor-generator is utilized to further improve powertrain efficiency. A hybrid vehicle employing a turbocharger motor-generator, however, would benefit from integration of control and coordination of the motor-generator and the turbocharger motor-generator operation in order to maximize powertrain efficiency.

Figure 1:
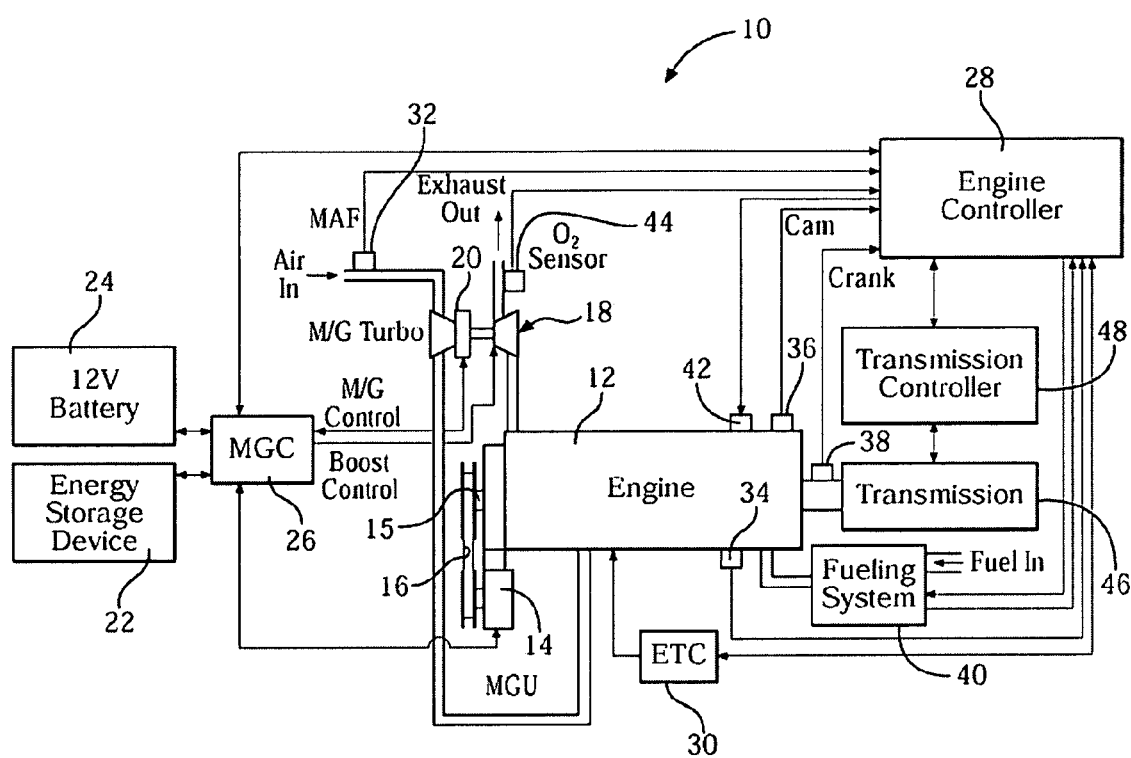
FIG. 1 is a schematic illustration of a motor-generator turbocharger (MGT) integrated in a mild hybrid powertrain.

Referring to the drawings, wherein like reference numbers refer to like components, FIG. 1 shows a mild hybrid powertrain 10 for a vehicle. A mild hybrid powertrain includes an engine 12. A motor-generator unit (MGU) 14 is operatively connected with the engine's crankshaft 15 via a belt 16. This type of hybrid system is generally referred to as alternator-starter. An alternator-starter is typically configured to restart the engine 12 if the host vehicle's brakes have been released following the engine's programmed shut down at a stop. The alternator-starter system is additionally configured to selectively assist the engine 12 in accelerating the vehicle and to provide regenerative charging of an on-board energy storage device 22, such as a hybrid battery, as is understood by those skilled in the art. Energy storage device 22 may be configured as a single battery, as multiple batteries, as a super-capacitor, as combination of both a battery and a super-capacitor, or as any other energy storage device suitable for a hybrid application. Engine 12 may be configured as any internal combustion engine, such as a spark or compression ignition type, using fuels such as ethanol, gasoline, diesel, compressed natural gas, a synthetic fuel, or any combination of such fuels.

Engine 12 employs a motor-generator turbocharger (MGT) 18. MGT 18 is driven by the engine's exhaust gasses (not shown) to provide positive pressure, i.e. boost, to the engine's intake manifold (not shown), in order to help the engine produce greater power. MGT 18 is provided with an integral motor-generator 20 for assisting turbocharger spool-up, and thus shortening duration of boost pressure build up during vehicle acceleration. MGT 18 is additionally configured to provide exhaust regenerative charging of the energy storage device 22 via the motor-generator 20 when the turbocharger is decelerating from sufficiently high rotational boost speeds, as understood by those skilled in the art.

FIG. 1 shows a single turbocharger 18, however, multiple turbochargers, arranged sequentially or in a parallel, may be provided depending on particular engine architecture and various functional requirements, as is understood by those skilled in the art. In any such configuration, at least one of the turbochargers may be MGT. It is preferable, but not necessary, that the MGT is constructed to use the same voltage as energy storage device 22, if the energy storage device's voltage is different from the 12 volts typically used in contemporary vehicles. When necessary, hybrid system voltage can be converted to 12 volts which is typically used by vehicle accessories (not shown), in order to permit the MGT to charge a separate 12 volt battery 24.

A motor-generator controller (MGC) 26 electronically interfaces with the MGU 14, the MGT 18 and the engine controller 28, to manage electrical power flow between the MGU 14, the MGT 18 and the energy storage device 22 and the battery 24. In managing the electrical power flow, MGC 26 controls and coordinates operation of MGU 14 and MGT 18 in response to sensed vehicle operating parameters. Vehicle operating parameters are received by the engine controller 28 from various sensors positioned on the vehicle for controlling engine function. As is understood by those skilled in the art, vehicle operating parameters may include, but are not limited to engine data from an electronic throttle controller (ETC) 30 indicating throttle position; a mass airflow sensor (MAF) 32; a manifold absolute pressure (MAP) sensor 34; a camshaft position sensor 36; a crankshaft position sensor 38; a fueling system 40, which includes fuel injectors, fuel pump and fuel sensor; an ignition system 42, which consists of ignition modules and spark plugs, if the engine is of spark ignition type; and an exhaust oxygen sensor 44. Vehicle operating parameters may also include vehicle speed data received from a sensor on the transmission 46 or from sensors located on the wheel of the vehicle (not shown). Additionally, vehicle operating parameters may include transmission functional status and data received from a transmission controller 48, such as, for example, current gear ratio and operating temperature.

Depending on the construction of the motor-generators 14 and 20, and the energy storage device 22 and the battery 24, MGC 26 may incorporate any necessary direct current (DC) to direct current converter, and/or alternating current (AC) to DC inverter. The MGC 26 may also be used to control boost pressure provided by the turbocharger, in place of using the engine controller 28, via, for example, a traditional wastegate or variable vanes in a variable vane geometry turbocharger (not shown). Although MGC 26 is shown as a standalone unit, it may also be integrated as part of the engine controller 28.

FIG. 2 shows engine 12 employing MGT 18 being utilized in a strong or a full hybrid vehicle powertrain 11. In a strong or a full hybrid powertrain, a motor-generator/transmission controller (MG/Trans Controller) 27 will take place of MGC 26 from FIG. 1, Hybrid Transmission 47 will take place of Transmission 46 from FIG. 1, and a conventional alternator (ALT) 17 will be used in place of the MGU 14 from FIG. 1, as compared with the mild hybrid shown in FIG. 1. All other elements of the powertrain remain the same as in the mild hybrid, and are labeled accordingly. In a strong hybrid, the MGU is integrated into the vehicle's hybrid transmission 47, as is understood by those skilled in the art. In such a case, a single MG/Trans Controller 27 may be utilized to control operating functions of the hybrid transmission as well as controlling and coordinating functions of the alternator and the MGT.

Although each of the motor-generators employed in MGU 14 and MGT 18 are capable of providing acceleration assist to the vehicle, they will, typically, do so in different ways. An MGU may be capable of adding as much as a 100 N-m torque directly at the engine's crankshaft across the engine's RPM range. The motor-generator in an MGT, on the other hand, is capable of mainly facilitating quicker build up of boost pressure, thus likely adding less to the overall torque output, and primarily at lower engine RPM. Additionally, an MGU is likely to provide its considerable torque assist with a delay of a few milliseconds, while an MGT will still experience a transient delay on the order of seconds, typical to some degree of all exhaust driven turbochargers. However, an MGU motor is likely to be at least one order of magnitude larger than that for an MGT, and is therefore expected to be less efficient. Based on these considerations, whenever acceleration demands are satisfactorily achievable via just the turbo, the MGT 18 may be used alone. When immediate, high and persistent acceleration is required, such as during a vehicle launch from a standstill, operation of both MGU 14 and MGT 18 is controlled and coordinated so that MGU may provide immediate assist while the turbo is still spooling up. When the turbocharger's rotational speed has increased allowing it to provide sufficient boost, the operation is transitioned to MGT alone. When immediate, brief assist is needed, MGU 14 is operated alone.

FIG. 3 shows a table of possible combinations of modes of operation of MGU 14 and MGT 18. MGU 14 may operate in a torque, i.e. acceleration, assist mode, deceleration (including during vehicle braking) regenerative charging mode, engine 12 driven charging mode, and at idle. MGT 18 may operate in a turbo acceleration assist mode, exhaust regenerative charging mode, and at idle. Among the possible combinations of modes of operation of MGU 14 and MGT 18, the simultaneous combination of MGT in acceleration assist mode and MGU in deceleration recharging mode is not practical, and unlikely to take place. The combination of MGT 18 in exhaust regeneration mode and MGU 18 in torque assist mode, although technically possible, is likely to be a rare occurrence. FIG. 3 shows possible combinations of modes of operation of MGU and MGT to aid explanation of the control software chart (shown in FIG. 4) below. The combinations of modes of operation which can aid vehicle acceleration are grouped together and are referred to as "group 1". The combinations with MGT 18 in the exhaust regenerative charging mode are grouped together and are referred to as "group 2". Such combinations of modes of operation of MGU and MGT may be stored as part of an algorithm in the MGC 26. Combinations of modes of operation where MGT 18 is idle and MGU 14 is either in regenerative recharging, charging or idle modes, are shown, but do not provide significant interplay. During modes of operation when the MGT is idle, the MGU is controlled in a way similar to that in a vehicle equipped solely with an MGU. In a strong hybrid powertrain 11 of FIG. 2, the second motor-generator is typically not used for providing electricity to meet vehicle electrical load requirements. Instead, a separate alternator may be utilized, and be controlled by the MGC 27 to function either in a charging or in an idle mode.

Figure 4:
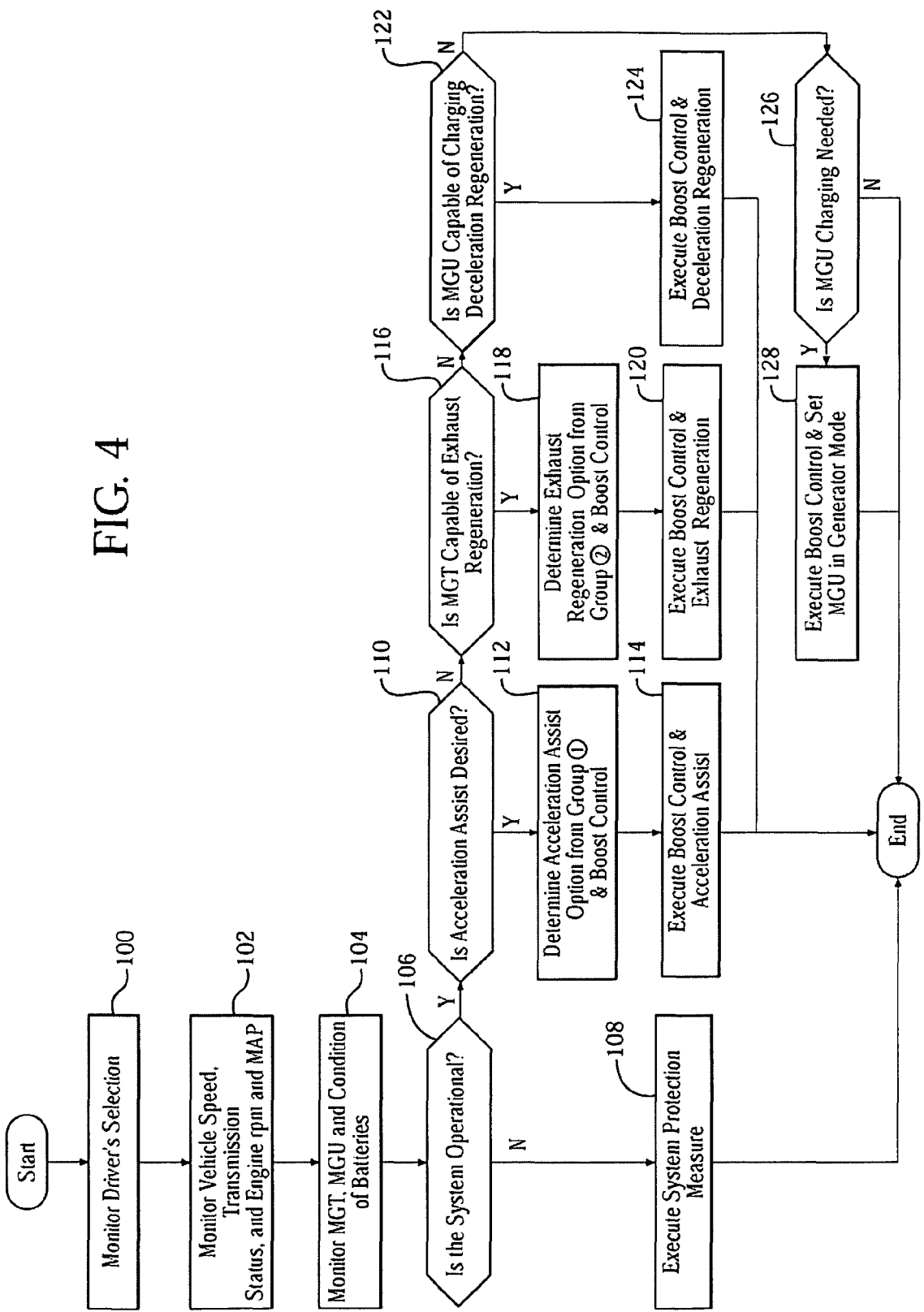
FIG. 4 is a flow chart illustrating a method of controlling and coordinating the MGT and the MGU.

FIG. 4 shows a method flowchart of the logic and control steps for the powertrain described in connection with FIGS. 1, 2 and 3. As shown, the method is initiated and monitoring of vehicle operator's intent, i.e. selection, with respect to vehicle operation, in particular with respect to acceleration and deceleration of the vehicle, is commenced in block 100. The operator's intent may be indicated, for example, by a signal received from ETC 30, denoting selected throttle position of the engine 12. In block 102 vehicle operating parameters, such as those described above in connection with FIGS. 1 and 2, are monitored. The method then advances to block 104. In block 104 operating conditions such as temperature and state of charging of energy storage device 22 and 12 volt battery 24, and rotational speeds of MGU 14 and MGT 18 are monitored via MGC 26 relative to a prescribed operating range. In block 106 a determination is made whether the system is operating properly. If the system is not operating properly, the method proceeds to block 108. In block 108 system protection measures are executed, such as activating a warning and preventing the regenerative charging function from taking place.

If the system is operating properly, the method proceeds to block 110, where, based on operator selection, desirability of acceleration assist is determined. If acceleration assist is desired, the method advances to block 112. In block 112 boost control is determined and an acceleration assist option is selected from group 1 shown in the table of FIG. 3, based on vehicle operating parameters and operator selection. The method then advances to block 114, where boost control and acceleration assist are executed. If in block 110 a determination is made that the acceleration assist is not desired, the method proceeds to block 116. In block 116 a determination is made whether the MGT 18 is in a mode of operation where it is capable of providing regenerative charging of the energy storage device 22, such as when the MGT 18 is decelerating from boost speeds or engine conditions are indicating sufficient exhaust flow rate. If the MGT 18 is capable of providing regenerative charging, the method advances to block 118. In block 118 regenerative charging option is selected from group 2 shown in the table of FIG. 3, and the best mode of operation for the MGU 14 and boost control are determined. The method then proceeds to block 120, where control of boost, MGT 18 regenerative charging and MGU 14 operation are executed.

If the MGT 18 is not capable of providing regenerative charging, such as, for example, when the turbocharger has not been spooled-up to a sufficiently high rotational speed, the method advances to block 122. In block 122 a determination is made based on vehicle operating parameters whether the MGU 14 is in a mode of operation where it is capable of providing regeneration during vehicle deceleration. If MGU 14 is capable of providing regenerative charging, turbo boost should not be needed, and the turbo boost control device position may be preselected for this mode of operation. The method then proceeds to block 124. In block 124 boost control and MGU 14 regenerative charging are executed, along with any other necessary controls of the vehicle, such as the brakes, by coordinating with other vehicle systems.

If MGU 14 is not capable of providing regenerative charging, i.e. the vehicle is not in the mode of deceleration regenerative charging, the method advances to block 126. In block 126 a determination is made whether charging via the MGU 14 is desirable, i.e. whether the MGU is needed to meet the vehicle's electrical load demand. If charging via the MGU 14 is desirable, the method proceeds to block 128 to set MGU 14 in generator mode and execute boost control accordingly. The foregoing changes are additionally communicated to the engine controller 28, in order to permit appropriate adjustments to the engine 12.

While the best modes for carrying out the invention have been described in detail, those familiar with the art to which this invention relates will recognize various alternative designs and embodiments for practicing the invention within the scope of the appended claims.

The invention claimed is:

1. A hybrid powertrain for a vehicle comprising:
an internal combustion engine arranged to propel a vehicle;
a turbocharger arranged relative to the engine for boosting torque of the engine and assisting acceleration of the vehicle;
an energy storage device arranged with respect to the powertrain for storing electrical energy;
a first motor-generator mounted with respect to the turbocharger and arranged to selectively assist acceleration of the vehicle by driving the turbocharger, to provide regenerative charging of the energy storage device, and to be idle, as modes of operation;
a second motor-generator mounted with respect to the powertrain and arranged to selectively assist acceleration of the vehicle, to provide charging of the energy storage device, to provide regenerative charging of the energy storage device, and to be idle, as modes of operation;
a sensor arranged with respect to the powertrain for sensing vehicle operating parameters; and
a controller responsive to the sensed vehicle operating parameters and arranged with respect to the powertrain for controlling and coordinating the modes of operation of the first motor-generator and of the second motor-generator;
wherein the controller is configured with a stored algorithm to combine the modes of operation of the first motor-generator and of the second motor-generator in a first group for assisting vehicle acceleration and the modes of operation of the first motor-generator and of the second motor-generator in a second group for providing regenerative charging, and additionally configured to select a combination from the first group to assist vehicle acceleration and from the second group to provide regenerative charging.

2. The hybrid vehicle powertrain of claim 1, wherein the first motor-generator is integrated with the turbocharger.

3. The hybrid vehicle powertrain of claim 1, wherein the second motor-generator is arranged as an alternator-starter.

4. The hybrid vehicle powertrain of claim 1, wherein the controller further controls turbocharger boost.

5. The hybrid vehicle powertrain of claim 1, further comprising a transmission operatively connected to the engine for transmitting torque from the engine, wherein the vehicle operating parameters include engine data, transmission data and vehicle speed.

6. The hybrid vehicle powertrain of claim 5, wherein the second motor-generator is integrated with the transmission, and the controller further controls function of the transmission.

7. The hybrid vehicle powertrain of claim 6, wherein the controller further controls function of a separate alternator.

8. The hybrid vehicle powertrain of claim 1, wherein the energy storage device comprises a battery.

9. The hybrid powertrain of claim 1, wherein the energy storage device comprises a super-capacitor.

10. A method of controlling a hybrid vehicle powertrain including an engine with a turbocharger comprising:
   monitoring vehicle operator selected vehicle acceleration and vehicle deceleration;
   monitoring vehicle operating parameters;
   monitoring operating conditions of a first motor-generator mounted with respect to the turbocharger and arranged to selectively assist acceleration of the vehicle by driving the turbocharger, and of a second motor-generator operatively connected to the engine;
   combining modes of operation of the first motor-generator and modes of operation of the second motor-generator where vehicle acceleration is assisted, and combining modes of operation of the first motor-generator and modes of operation of the second motor-generator where regenerative charging is provided, wherein the modes of operation of the first motor-generator include conditions in which vehicle acceleration is assisted, regenerative charging of an energy storage device arranged on the vehicle is provided, and the first motor-generator is idle, and the modes of operation of the second motor-generator include conditions in which vehicle acceleration is assisted, charging of the energy storage device is provided, regenerative charging of the energy storage device is provided, and the second motor-generator is idle;
   grouping into a first option combinations of the modes of operation of the first motor-generator and the modes of operation of the second motor-generator where vehicle acceleration is assisted, and grouping into a second option combinations of the modes of operation of the first motor-generator and the modes of operation of the second motor-generator where regenerative charging is provided; and
   controlling and coordinating operation of the first motor-generator and of the second motor-generator by selecting from the combinations in the first option for acceleration assist, and from the combinations in the second option for deceleration.

11. The method of claim 10, wherein said controlling and coordinating further comprises controlling turbocharger boost.

12. The method of claim 10, wherein said monitoring operating conditions of the first motor-generator comprises monitoring of the first motor-generator integrated with the turbocharger.

13. The method of claim 10, wherein the powertrain includes a transmission, and wherein said monitoring vehicle operating parameters comprises monitoring engine data, transmission data and vehicle speed.

14. The method of claim 13, wherein the second motor-generator is integrated into the transmission and monitoring operating conditions of the second motor-generator further comprises monitoring functions of the transmission.

15. The method of claim 14, wherein said monitoring vehicle operating parameters further comprises monitoring function of a separate alternator.

16. The method of claim 10, wherein said regenerative charging of the energy storage device comprises regenerative charging of a battery.

17. The method of claim 10, wherein said regenerative charging of the energy storage device comprises regenerative charging of a super-capacitor.

* * * * *